(No Model.)
L. B. HUNT.
MACHINE FOR MAKING AXES, HATCHETS, &c.
No. 314,842. Patented Mar. 31, 1885.
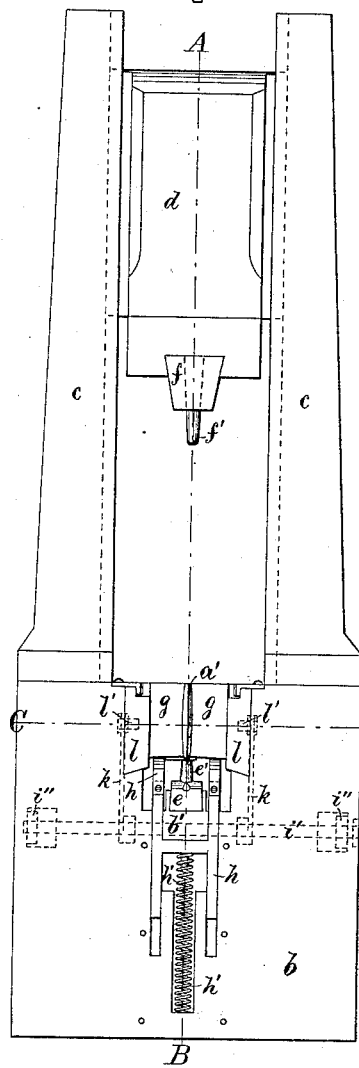
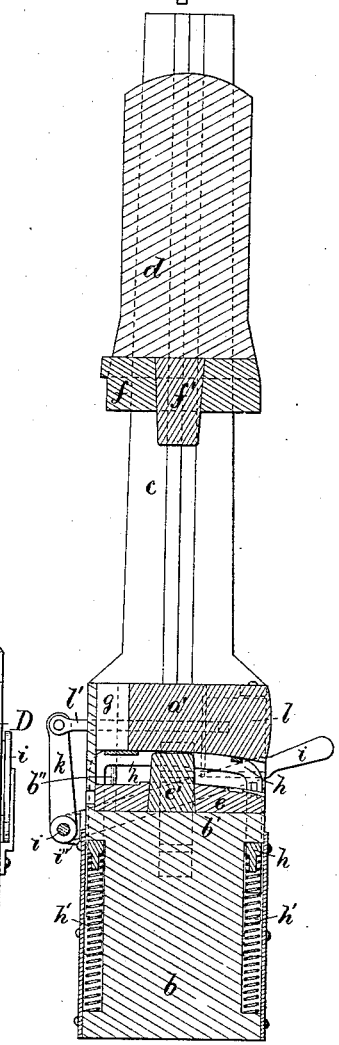
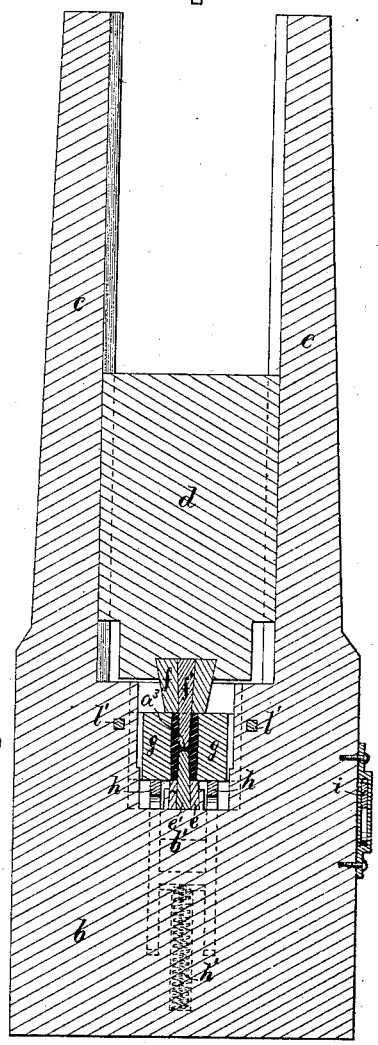
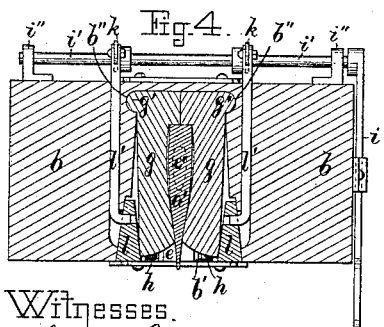
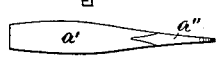
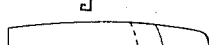
Witnesses
Henry Chadbourn
Geo. E. Ostburg
Inventor
Leander B. Hunt
by Alban Andrew atty

UNITED STATES PATENT OFFICE.

LEANDER B. HUNT, OF HYDE PARK, MASSACHUSETTS, ASSIGNOR OF ONE-THIRD TO THEODORE H. VIDETO, OF SAME PLACE.

MACHINE FOR MAKING AXES, HATCHETS, &c.

SPECIFICATION forming part of Letters Patent No. 314,842, dated March 31, 1885.

Application filed February 9, 1884. (No model.)

*To all whom it may concern:*

Be it known that I, LEANDER B. HUNT, a citizen of the United States, residing at Hyde Park, in the county of Norfolk and State of Massachusetts, have invented certain new and useful Improvements in Machines for Making Axes, Hatchets, and Similar Tools; and the same are fully described in the following specification and illustrated in the accompanying drawings.

This invention relates to improvements in machines for making axes, hatchets, and similar tools having an eye for the reception of a handle; and the invention consists in means for making the double tapering eye in such tools, as well as means for shaping the tools to their desired and finished form, as will hereinafter be more fully shown and described, reference being had to the accompanying drawings, where—

Figure 1 represents a front elevation of my improved machine. Fig. 2 represents a vertical section on the line A B shown in Fig. 1. Fig. 3 represents a longitudinal section of the machine on a line at right angle to the section represented in Fig. 2, showing the drop in its lower position. Fig. 4 represents a cross-section on the line C D shown in Fig. 1. Fig. 5 represents a top view of an ax-blank before being provided with its eye and before being shaped and finished. Fig. 6 represents a side view of the ax-blank shown in Fig. 5. Fig. 7 represents a top view of the ax after the eye is made through it and after it is finished and formed. Fig. 8 represents a longitudinal section of the finished ax on the line E F shown in Fig. 7, and Fig. 9 represents a cross-section on the line G H shown in said Fig. 7.

Similar letters refer to similar parts wherever they occur on the different parts of the drawings.

It is desirable that the eye $a$ of an ax or similar tool (shown in Figs. 7, 8, and 9) should be made tapering from two opposite sides, so as to permit the handle to be secured within such eye in a firm and substantial manner, and for the purpose of making the eye with such a double internal taper, and at the same time to form the exterior of the ax, &c., to a finished shape, I proceed as follows:

In carrying out my invention I use a suitable drop-machine, as shown in Figs. 1, 2, 3, and 4, in which $b'$ is the lower stationary anvil, made in one piece or secured in a firm and substantial manner to the base $b$. $c\ c$ are the vertical guides for the drop or weight $d$, as is usual in drop-hammers. The drop $d$ is raised by any of the usual means well known in the art, and allowed to descend by its own gravity onto the article to be punched and shaped, such raising and releasing mechanism for the drop $d$ being, however, not shown in the drawings.

The upper part of the anvil $b'$ is grooved and adapted to receive the lower die, $e$, in a vertical perforation of which is secured the lower male tapering punch or eye-former, $e'$, as shown in Figs. 2 and 3.

In a groove in the lower end of the drop $d$ is secured the upper die, $f$, in a vertical perforation of which is secured the upper male tapering punch or eye-former, $f'$, as shown in Figs. 1, 2, and 3.

The eye-formers $e'\ f'$ are each made of a length beyond their respective dies equal to a little less than one-half of the height of the ax at the place where the eye is located and of the desired form of about one-half of the double tapering eye to be made in the tool.

$g\ g$ are the laterally-movable shaping-dies for forming and finishing the sides of the ax or other tool, each of such dies being preferably provided in its rear end with a side projection, $g'$, fitting loosely in a corresponding vertical groove or recess, $b''$, in the top of base $b$, as shown in Fig. 4, acting as hinges on which the respective dies $g\ g$ are permitted to move in a lateral direction. The shaping-dies $g\ g$ rest loosely on top of the vertically-yielding die-supports or bed $h\ h$, which are normally held in their upper position (shown in Figs. 1 and 2) by the influence of coiled springs $h'$, located below in a suitable recess in the base $b$ of the machine. The dies $g\ g$ are made laterally movable to enable them to be spread apart previous to inserting between them the heated ax-blank that is to be shaped, finished, and provided with an eye, and to permit such ax-blank after being shaped and punched to be easily removed from between the said dies. It is also necessary that the said dies $g\ g$ should be held rigidly up against the sides of the heated ax-blank during the time it is penetrated by the eye-formers $e'$ $f'$, and for this purpose I arrange on one side of the base $b$ a suitable lever, $i$, the rear end of which is secured to a rock-shaft, $i'$, located in suitable bearings, $i''$ $i''$, secured to the rear of base $b$. To the shaft $i'$ are secured a pair of levers, $k$ $k$, the upper ends of which are jointed to the horizontal rods $l'$ $l'$, attached to or forming a part of the respective sliding wedges $l$ $l$, located in bearings in the base $b$ outside of the respective dies $g$ $g$, as shown in Figs. 1, 3, and 4, by which arrangement when the forward end of lever $i$ is raised the wedges $l$ $l$ are automatically drawn to the rear, and thus causing the dies $g$ $g$ to be forced toward each other and against the outside of the ax-blank placed in the space between them, and to be firmly held rigidly in such position during the operation of punching the eye through the blank and finishing the outside of it. After this is done the dies $g$ $g$ are liberated from the ax by simply depressing the front end of lever $i$, causing the wedges $l$ $l$ to move forward, and so on during the operation of the machine.

In making the tools I proceed as follows: After the blank $a'$ is made and its steel $a''$ welded to it, as usual, it is heated in a suitable forge to the desired red heat, and in this condition it is inserted between the expanded shaping-dies $g$ $g$, its lower end resting loosely on the top of the lower eye-former, $e'$, and the blank is then centered and firmly secured between the dies $g$ $g$ by raising the lever $i$ and causing the wedges $l$ $l$ to crowd the said dies against the outside of blank $a'$, as shown in Fig. 4. During this part of the operation the drop or hammer $d$, its die $f$, and eye-former $f'$ are held in their upper position, as shown in Figs. 1 and 2. The drop $d$ is then released, causing the eye-former $f'$ to penetrate the ax-blank about half of its depth, and at the same time causing the blank and its shaping-dies $g$ $g$ to yield downward until said blank and dies are brought to a rest on the lower die, $e$, during which operation the lower eye-former, $e'$, penetrates the ax-blank from below a distance equal to about one-half of the depth of said blank, as shown in Fig. 3, and producing by this operation a double-tapering eye in the tool with a thin film or burr, $a^3$, remaining in the central part of the eye at the meeting edges of the eye-formers $e'$ $f'$, as shown in Figs. 2 and 3, which is easily removed after the finished blank is taken away from the machine. Such removal of the burr $a^3$ may be done by a suitable plunger fitted for this purpose and operated either by hand or in a suitable machine. At the same time as the double-tapering eye is formed by the punches $e'$ $f'$ the dies $e$ and $f$ compress or bear against the blank in the direction of the eye, so as to form or maintain the shape of the upper and lower edges or faces of the blank, as will appear from Fig. 3, and the exterior of the ax-blank is automatically finished by the metal being crowded against the interior of the dies $g$ $g$, which are shaped to correspond with the desired finished form of the ax, or other tool that is being made. The drop $d$ is then raised, the lever $i$ is depressed, by which the dies $g$ $g$ release their hold on the blank, which, with the dies $g$ $g$, is automatically raised by the influence of the springs $h'$ $h'$ and yielding bed $h$ $h$, and the now finished ax is then removed, and the machine ready for another operation, and so on.

In practice I prefer to use two machines, one of which is provided with sharp slitters or punches, corresponding in positions and operations with the eye-formers $e'$ $f'$, and adapted to slit the blank from two opposite sides where the eye is to be formed, and without reheating the blank it is introduced into the machine as shown and described, and there eye-pointed and finished; and this I prefer to do so as to prevent the last-named machine from too hard usage and to facilitate its proper operation, although I may, if so desired, produce the finished ax by one or two blows in a single machine.

My invention may be so modified as to employ two eye-formers movable toward each other from opposite directions, instead of having one movable and one stationary.

I wish to state that I do not confine myself to the exact arrangement for moving the dies $g$ $g$ in a lateral direction, as shown in the drawings, by means of lever $i$ and connecting mechanism to wedges $l$ $l$. Neither do I wish to confine myself to the precise arrangement of the coiled springs $h'$ $h'$ for raising the dies $g$ $g$, as this may be done by similar means to equal advantage without departing from the essence of my invention; but What I desire to secure by Letters Patent and claim is—

1. In a machine for making the eye in and finishing axes or other tools, the die $e$, provided with the eye-former $e'$, in combination with the die $f$, provided with the eye-former $f'$, substantially as described.

2. In a machine for making the eye in and finishing axes or other tools, the combination of the die $e$, provided with eye-former $e'$, die $f$, provided with eye-former $f'$, and the laterally-movable dies $g$ $g$, substantially as described.

3. The combination of the die $e$, provided with eye-former $e'$, the die $f$, provided with eye-former $f'$, the laterally-movable dies $g$ $g$, and the yielding die-supports $h$ $h$, located beneath the dies $g$ $g$, substantially as described.

4. The combination of die $e$, provided with eye-former $e'$, the die $f$, provided with eye-former $f'$, yielding die-support $h$ $h$, the laterally-movable dies $g$ $g$, bearing upon said movable supports, and mechanism, such as described, for forcing the laterally-movable dies against the blank, substantially as described.

In testimony whereof I have affixed my signature in presence of two witnesses.

LEANDER B. HUNT.

Witnesses:
ALBAN ANDRÉN,
HENRY CHADBOURNE.